Patented Mar. 20, 1928.

1,663,119

UNITED STATES PATENT OFFICE.

COLE COOLIDGE, OF WILMINGTON, DELAWARE, AND HERBERT E. EASTLACK, OF PARLIN, NEW JERSEY, ASSIGNORS TO E. I. DU PONT DE NEMOURS & COMPANY, OF WILMINGTON, DELAWARE, A CORPORATION OF DELAWARE.

COATING COMPOSITION AND PROCESS OF MAKING THE SAME.

No Drawing.      Application filed July 3, 1925. Serial No. 41,411.

This invention relates to compositions as enamels, varnishes, paints, lacquers and coating compositions generally, which compositions contain rubber, with or without an oil, and a method for their preparation. More specifically it has to do with the regulation of the viscosity of such preparations, and especially with the elimination or control of the phenomena termed by us "lobbering."

Before proceeding further with the description of the invention, it seems advisable to avoid possible misunderstanding by defining certain terms in the sense that we hereinafter employ them.

We define "lobbering" as a gelation of the rubber, which gives a false body or jelly-like consistency to the coating composition and which prevents proper flowing out of the liquid when it is used for coating purposes. Lobbering as thus defined is not to be confused with the term as used in ordinary paint and varnish practice.

As used herein, a "delobbering agent" is a substance which apparently has the property of peptizing the rubber sol or gel, and in that process lowers the viscosity of the sol or gel resulting in a transformation from a jelly-like substance to a smooth flowing liquid suitable for coating purposes.

In the use of the term "rubber" we do not wish to limit ourselves to crude or unvulcanized Hevea rubber, although the use of this variety is to be preferred in the practice of our invention. In the interpretation of our specification and claims, the term "rubber" is meant to include not only crude or unvulcanized caoutchouc, under which head may be included all the botanical varieties such as Hevea, balata, gutta percha, etc., but, as well, to include vulcanized rubber of any botanical variety in the state of partial vulcanization to the state of complete vulcanization; also reclaimed rubber.

The term "oil" is used to cover animal, vegetable, or mineral oil including all types of drying, semi-drying or non-drying oils, and as well, specially treated oils such as blown or ozonized oils.

By the term "drier" is meant a salt or oxide of a metal such as cobalt, lead, manganese, zinc, etc., or a mixture thereof which functions probably as a carrier of oxygen, thereby catalyzing the oxidation of oil and, as well, curing the rubber probably through a similar process, bringing about through such reaction, usually a loss in viscosity, apparently due to the depolymerization or deaggregation of the rubber.

The terms "thinner" and "pigment" when used will have the meaning commonly assigned them in ordinary paint and varnish practice.

The terms "lobbering," "delobbering agent," "rubber," "oil," "drier," "pigment" and "thinner" wherever used above or subsequently, are to be construed as having the meaning given in the foregoing definitions.

Methods of preparing paints, varnishes, lacquers, enamels, or coating compositions containing rubber have been disclosed in co-pending applications, Serial Nos. 681,648; 736,017; 749,980; 750,661; dated Dec. 19, 1923; Sept. 5, 1924; Nov. 14, 1924; Nov. 18, 1924, respectively.

As appears therefrom, rubber may be suitably plasticized by milling on a rubber mill according to well known methods, and may then be dissolved in suitable solvents, such as turpentine, solvent naptha, benzol, or certain petroleum distillates. Such solutions may, if desired, be mixed with oils (such as linseed, Perilla, wood, fish or soya bean oils) and metallic driers (such as cobalt or lead linoleates) to form coating compositions which when dried at ordinary or elevated temperatures, harden to form hard, tough, elastic films impervious to water and very durable. Pigments may also be incorporated with such coating compositions to form paints or enamels which yield protective coatings of great durability.

We have discovered, however, that when certain pigments are incorporated with coating compositions, such as have just been described, the phenomenon of lobbering as previously defined, takes place.

As examples of pigments which cause lobbering in such coating compositions, may be cited in particular, Prussian blue, carbon black, and certain of the lake pigments, e. g., maroon. Prussian blue, while producing lobbering to a marked extent when introduced into a rubber solution, is also, in the presence of air, a viscosity reducing pigment. The latter and their action on rubber solutions are discussed in the application of Stine et al, Serial No. 736,017. The viscosity of the lobbered composition containing Prussian blue will therefore rapidly decrease to an undesirable degree unless depolymerization is prevented by the use of an inhibiting agent, as disclosed in said application.

A number of so-called "inerts" or fillers such as aluminum hydrate and blanc fixe also cause lobbering when incorporated with coating compositions containing rubber. The above mentioned materials usually cause lobbering to such an extent as to render the coating composition unfit for use. Some pigments such as Titanox, blue lake and chrome green, cause lobbering to a somewhat less extent and still others such as zinc oxide and ultramarine blue may be incorporated in coating compositions containing rubber with substantially no indication of lobbering.

We have found that the lobbered condition of a coating composition may frequently but not always be temporarily overcome by violent agitation or stirring. In such case, however, the lobbered condition usually returns after several hours standing. A more satisfactory remedy and one which constitutes the principal feature of this invention consists in the addition of certain materials to the lobbered coating composition. Crude oleic acid has been found to be particularly effective for this purpose. Also acids derived from a number of oils (such as linseed, Perilla, soya bean, China wood, menhaden, oxidized castor oil and Turkey red oil and its acids, as well as rosin acids) by saponification with alkali, separation of the soaps and acidification, are of value. Certain other acids, e. g., acetic and trichloracetic may also be used. As an illustration, an enamel of the following composition shows very definitely the phenomenon which we have termed lobbering:

| | Per cent. |
|---|---|
| Milled rubber | 4.1 |
| Bodied linseed oil | 18.0 |
| Petroleum distillate thinner | 68.0 |
| Cobalt linoleate | 0.3 |
| Prussian blue | 9.6 |

The addition of about 3 grams of crude oleic acid to 100 grams of this enamel promptly and permanently removes the lobbered condition and yields a material which is highly satisfactory for coating purposes.

This process we term delobbering and oleic acid is, therefore, a delobbering agent.

The following amounts of other materials have also been found to produce the same result as 3 grams crude oleic acid:

| | Grams. |
|---|---|
| Pure oleic acid | 6 |
| Acids from blown linseed oil | 6 |
| Acids from menhaden oil | 6 |
| Acids from castor oil | 6 |
| Acids from China wood oil | 6 |
| Acids from soya bean oil | 6 |
| Acids from Perilla oil | 6 |
| Acids from Turkey red oil | 4 |
| Acids from oxidized castor oil | 4 |
| Rosin acids | 6 |
| Acetic acid | 10 |
| Trichloracetic acid | 3 |

It will be noted that a smaller quantity of crude oleic acid is required than any of the other materials tried with the exception of trichloracetic acid. Crude oleic acid is a very effective delobbering agent, although the amounts of other materials required are practicable and result in enamels which are satisfactory for coating purposes.

It is to be understood that the above data are given purely for illustrative purposes and that the scope of the invention is in no manner limited to the proportions of ingredients or delobbering agents listed above. As a matter of fact, the proportions of the various ingredients used in such coating compositions prepared from different pigments vary considerably. Other oils may be used and in different proportion; the proportions of rubber, thinner oil and pigment may be varied over a wide range, depending on the particular purpose for which the enamel is to be used. The amount of delobbering agent will also vary, depending on the particular type and amount of pigments employed, and to some extent upon the nature of the rubber used as will be described below. With pigments which cause lobbering to a greater or less extent, from about 0.5 to 10 grams of delobbering agent per 100 grams of enamel are usually required.

We have found that the delobbering agent may be added to the coating composition in a variety of ways without affecting the result. For example, it may be added to the rubber solution or to the oil or to a mixture of the two or to a combination of rubber and oil during the grinding of pigment therein, or as illustrated above, it may be added to the completed enamel. The only difference is that if the delobbering agent is added prior to bringing the rubber and pigment in contact, lobbering is prevented; if added afterwards, the lobbered condition of the enamel is removed. The net result is the same in either case.

An analogous use for our delobbering agents results from the well known fact that the viscosity of a solution of rubber in a solvent, other things being equal, depends on the degree of plasticity or amount of milling which the rubber has undergone—the greater the amount of milling, the lower the viscosity of a rubber solution of a given concentration. The viscosity of coating compositions of the type herein discussed is of course, greatly influenced by the viscosity of the rubber solution. We have found that the viscosity of a rubber solution or of a varnish, paint, or enamel prepared from it can be materially reduced by the addition of materials which have been found to be effective delobbering agents. It is evident that this discovery may be made use of in regulating the viscosity of rubber solutions or of rubber-oil varnishes or of enamels made by the incorporation of pigments therein, even though such pigments do not actually cause lobbering.

Regardless of the original viscosity of any two rubber solutions made up from rubber which has undergone any degree of plasticization, it has been discovered that by means of delobbering agents, these two rubber solutions can be brought to the same viscosity, provided they are the same in concentration. This information is of prime importance, inasmuch as the viscosity of any rubber solution may be reduced to a definite figure no matter what the previous plasticity of the rubber contained therein may have been. Moreover, when this lower level of viscosity has been reached by the use of delobbering agents, further addition only decreases the viscosity of the solution, as described above through the effect of dilution.

We claim:

1. A process of regulating the viscosity of a coating composition containing a non-aqueous solution of rubber which comprises adding to said composition a delobbering agent.

2. A process of regulating the viscosity of a coating composition containing a solution of rubber and a pigment adapted to give rise to a lobbered condition which comprises adding to said solution a delobbering acid.

3. A process of regulating the viscosity of a coating composition containing a non-aqueous solution of rubber which comprises adding to said composition a delobbering agent comprising oleic acid.

4. A process of removing a lobbered condition from a coating composition containing rubber and a pigment ordinarily giving rise to such condition which comprises adding to said composition a delobbering agent.

5. A process of removing a lobbered condition from a coating composition containing rubber and a pigment ordinarily giving rise to such condition which comprises adding to said composition a delobbering agent which comprises oleic acid.

6. A process of regulating the viscosity of a solution of rubber which contains a pigment which comprises adding to said solution a delobbering agent.

7. A process of regulating the viscosity of a solution of rubber which contains a pigment which comprises adding to said solution a delobbering agent comprising oleic acid.

8. A process for regulating the viscosity of a coating composition containing rubber and a pigment which ordinarily gives rise to such condition, which comprises adding to said composition a delobbering agent comprising oleic acid.

9. A process for making a coating composition which comprises mixing a solution of rubber with a drying oil, a metallic drier, a pigment which gives rise to a lobbered condition, and a delobbering agent.

10. A process for making a coating composition which comprises mixing a solution of rubber with a pigment which ordinarily gives rise to a lobbering condition, a drying oil, a metallic drier and from 0.5 to 10% of oleic acid.

11. A coating composition comprising a rubber solution, a pigment adapted to give rise to a lobbered condition and a delobbering agent.

12. A coating composition comprising a non-aqueous rubber solution and a delobbering acid.

13. A coating composition comprising a pigment adapted to give rise to a lobbered condition a rubber solution and oleic acid.

14. A coating composition comprising a solution of rubber, a pigment which ordinarily gives rise to lobbering in a rubber solution, and a delobbering agent.

15. A coating composition which comprises a solution of rubber, a pigment which ordinarily gives rise to lobbering in a rubber solution, and oleic acid.

16. A coating composition comprising a solution of rubber, a pigment which ordinarily gives rise to lobbering in a rubber solution, a drying oil and a delobbering agent comprising from .05 to 10% of oleic acid.

In testimony whereof we affix our signatures.

COLE COOLIDGE.
HERBERT E. EASTLACK.